Figure 1:
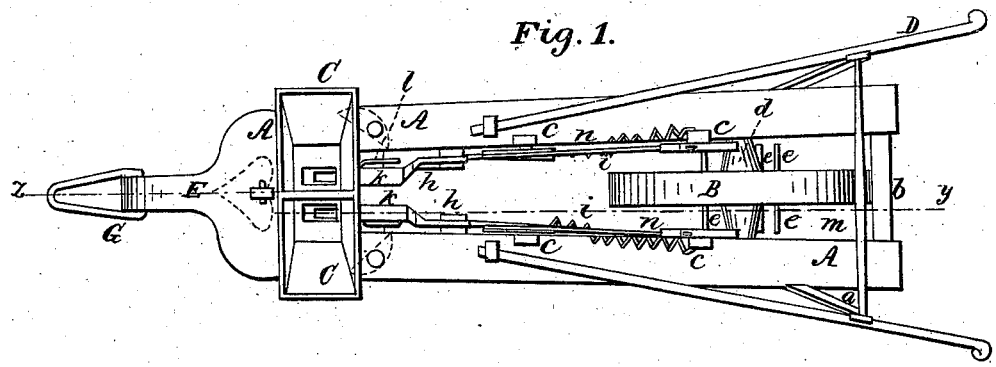

N. A. & J. S. CLOPTON.

Seed Planter.

No. 83,364. Patented Oct. 27, 1868.

Witnesses:
Alex Mahon
Jos. L. Coombs

Inventors:
N. A. Clopton
J. S. Clopton
by their atty
S. S. Fahnestock

N. A. CLOPTON AND JOHN S. CLOPTON, OF FAUQUIER COUNTY, VIRGINIA.

Letters Patent No. 83,364, dated October 27, 1868.

IMPROVEMENT IN SEEDING-MACHINE.

The Schedule referred to in these Letters Patent and making part of the same.

*To all whom it may concern:*

Be it known that we, N. A. CLOPTON and JOHN S. CLOPTON, of Fauquier county, State of Virginia, have invented a new and improved Seeding-Machine; and we do hereby declare that the following is a full and exact description thereof, reference being had to the accompanying drawings, making a part of this specification, and in which like parts are represented by like letters in the several figures.

The nature of our invention consists in so constructing a seeding-machine that the furrow is first made for the seed to drop into, the seed and fertilizer gauged in chambers or recesses at the bottom of the receivers, which being opened, both fall together, and are covered immediately by side-plows or shares, and the ground then rolled, all at one operation.

To enable others skilled in the art to make and use our invention, we will proceed to describe its construction and operation.

In the drawings—

Figure 1 represents a top view of our machine, and

Figure 2:
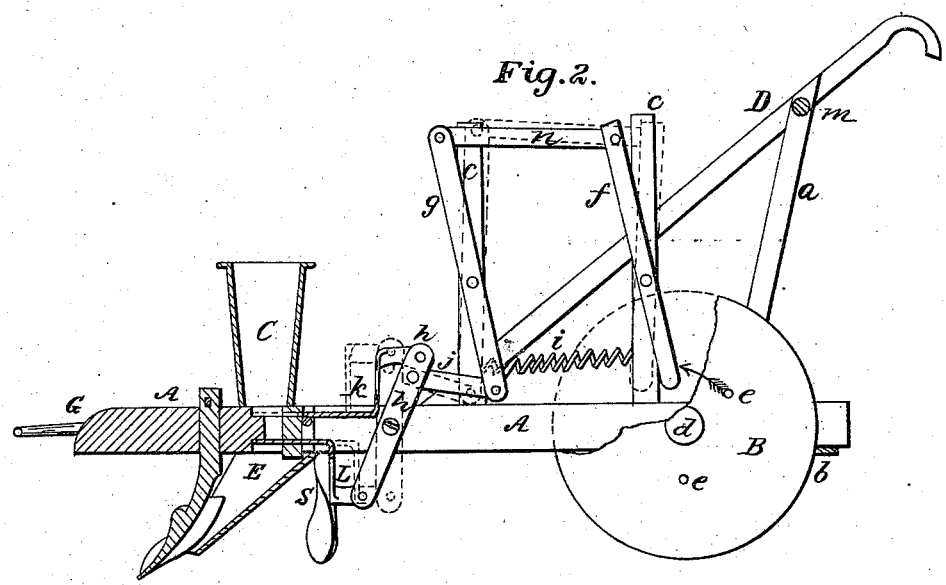

Figure 2, a side elevation of vertical section, on line z–y, fig. 1.

A represents a V-shaped frame, having the usual handles, D, with their supporting-pieces a and connecting-piece m.

B is a roller at the rear end of the machine, its axle d being secured to frame A. B has several projecting pins, e—as many as may be wanted for their purpose, say, three—and they move in the direction indicated by the arrow, striking against the lower ends of pivoted arms f.

c represents four uprights, secured in or to the side of the frame A, and to which are pivoted arms f and g, the top parts of which are connected by pieces n.

The lower ends of pieces g are attached to the lower ends of stationary rear pieces c, by coiled springs i. The lower ends of pieces g are also connected, by pieces j, to the upper ends of vibrating arms or levers h, pivoted to A, and to the upper and lower ends of h are secured elbowed slides k and l, which move forward and backward, entering the front of frame A, underneath a hopper or receiver, C, which has two apartments, one for seed, and the other for a fertilizer.

F is a spout, covering two openings at bottom of C, which pass through frame A.

s represents two covering-plows or shares, one on each side of frame A, to turn the soil inward over the seed, &c., just dropped through F, and E is a double plowshare, which makes, first of all, the furrow, throwing the soil outward on each side.

G is the usual clevis, and b is a connecting-piece at the rear, for the sides of A.

In the normal position, as shown in black ink in the drawings, the upper slides k are withdrawn, and the chambers below open, supposed to be full.

The operation is as follows: The machine being moved forward, as the pins e strike against the lower ends of f, they are pushed forward into the position shown in red ink, when it will be seen, by their connection with h, through n, g, and j, the slides k will be pushed forward, closing the tops of the small chambers which contain the charge of seed and fertilizing material, while the lower slides l are withdrawn, and the charges fall down through the spout, into the furrow beneath it. After pin e passes under f, the spring i retracts g, and, with k and l, is pushed forward in time to close the bottom of chambers, so as to hold a new charge. This operation is repeated every time a pin, e, strikes the pieces f. After the seed, &c., is dropped, then covered by following-plows s, the ground is then rolled by B, thus completing the operation.

The capacity of the chambers can be readily regulated at pleasure, as also the throw of the slides at top and bottom of same.

When done planting, (and yet moving the machine,) the reciprocating motion of the slides can be obviated by disconnecting the springs from rear posts c, or in any other suitable way. It will thus be seen we can deliver or drop any desired quantity of seed and fertilizing-matter, and as rapidly or slowly as desired, and we can drop seed alone.

The size of the wheel or roller, and the number of pins in it, serve to regulate the process of seeding, &c. The pivoted arms g f may be operated by cams, attached to the side of wheel B, replacing the pins e, which strike against the lower ends of pieces f, or projections in the ends of these pieces may enter a suitable slot in the sides of B, but these are mere equivalent devices.

Having thus described our invention,

What we claim as new, and desire to secure by Letters Patent of the United States, is—

The combination and arrangement of the reciprocating slides k l, vibrating arms or levers h, connecting-pieces or links j, pivoted arms g f, and springs i, or their equivalents, constructed and operated in the manner substantially as shown and described, and for the purpose set forth.

N. A. CLOPTON.
JNO. S. CLOPTON.

Witnesses:
I. W. COLBERT,
CHAS. O. EMBREY,
I. M. GLASS,
N. D. EMBREY.